United States Patent [19]

Yamada et al.

[11] Patent Number: 4,575,536

[45] Date of Patent: Mar. 11, 1986

[54] RESINOUS COATING COMPOSITION CURABLE AT LOW TEMPERATURE

[75] Inventors: Mitsuo Yamada; Hiromichi Tamasaki, both of Osaka, Japan

[73] Assignee: Nippon Paint Co., Ltd., Osaka, Japan

[21] Appl. No.: 595,382

[22] Filed: Mar. 30, 1984

[30] Foreign Application Priority Data

Apr. 2, 1983 [JP] Japan .................................. 58-58545

[51] Int. Cl.$^4$ ............................................. C08L 61/28
[52] U.S. Cl. ...................................... 525/162; 525/157; 525/428; 525/443; 525/465; 525/456; 525/510
[58] Field of Search ............... 525/162, 443, 428, 456, 525/465, 510, 157; 528/254

[56] References Cited

U.S. PATENT DOCUMENTS 4,425,466 1/1984 Santer et al. .................... 525/162 X Primary Examiner—Theodore E. Pertilla
Attorney, Agent, or Firm—Wenderoth, Lind & Ponack

[57] ABSTRACT

A coating composition comprising as resinous vehicle, a melamine resin, and a crosslink curable type resin having functional groups capable of reacting with the melamine resin, which is characterized in that the melamine resin has a weight-average molecular weight by Gel Permeation Chromatography of 6000 to 12000 and bears as functional groups, imino, methylol and alkoxymethylol groups, the sum of imino and methylol groups being, when expressed in terms of average number per triazine nucleus, 2.0 to 2.5, the number of alkoxymethylol groups being 2.0 or more, and the ratio of methylol groups to imino groups being 1.0 to 2.5.

The coating composition is characterized by having, inter alia, a low temperature curing property and excellent intercoat adhesion.

5 Claims, No Drawings

RESINOUS COATING COMPOSITION CURABLE AT LOW TEMPERATURE

FIELD OF THE INVENTION

The present invention relates to a coating composition and more specifically, a coating composition which is curable at a relatively low temperature and is excellent in intercoat adhesion.

BACKGROUND OF THE INVENTION

Since melamine resin has active groups as active hydrogen, active methylol, active alkoxymethyl or the like, it is customarily combined with a number of coating base resins having functional groups which are reactive with the abovesaid active groups, like hydroxyl and isocyanate, including alkyd resin, polyester resin, acrylic resin, epoxy resin, polyurethane resin, polyamide resin and polycarbonate resin, and is widely used as thermosetting curable coating compositions. However, in such coating compositions based on the combination of melamine resin and the abovementioned base resins, it is generally required to use a relatively high baking temperature as, for example, 140° C. for the combination of commercially available melamine resin and alkyd resin, and 170° C. and more for the combination of such melamine resin and epoxy resin. From the standpoint of energy saving, much preference is given to the use of lower baking temperature. It is, however, pointed out that with the abovementioned melamine resin, a lower temperature baking will inevitably cause insufficient coating hardness and undesired tack feeling on the coating and therefore, it has been believed that the curing will require a minimum baking condition of 140°~160° C. and 20~30 minutes under the circumstances.

Recently, there has been provided, as the so-called low temperature curing type resin, a highly self-condensable melamine resin, which is said to be curable at 100°~120° C. in 20 to 30 minutes. However, even with this type of melamine resin, there are such problems that the allowable temperature range in obtaining the baked coating with defined film performance is rather narrow (i.e. considerable temperature dependency for baking temperatures) and if the baking temperature control is not so good, Tg and crosslinked density of the coating will fluctuate in wider ranges and the intercoat adhesion will get worse due to the change in coating shrinkage and accumulation of inner stress of the coating. Therefore, in the combination with a variety of base resins, a melamine resin has long been desired which will show a small temperature dependency for baking temperatures, is curable at a relatively lower baking temperature and is excellent in inter-coat adhesion. The invention has been made to satisfy this need.

SUMMARY OF THE INVENTION

According to the present invention, there is provided a coating composition comprising as resinous vehicle a melamine resin (A) having a weight-average molecular weight (MW) by Gel Permeation Chromatography of 6000~12000 and having as functional groups, imino, methylol and alkoxymethylol groups, the sum of imino and methylol groups being, when expressed in terms of average number of functional groups per triazine nucleus, 2.0~2.5, the number of alkoxymethylol groups being 2.0 or more, and the ratio of methylol groups to imino groups being 1.0~2.5, and crosslink curable type resin (B) having functional groups which are reactive with those of said melamine resin.

PREFERRED EMBODIMENTS OF THE INVENTION

The most characteristic feature of the present invention resides in the employment of particular type of melamine resin controlled in kind and amounts of the functional groups and in the molecular weight as hereinabove defined, together with a base resin. In a curing step, it is believed that co-condensation reaction between melamine resin and base resin, self-condensation reaction of melamine resin and the like occur simultaneously and macro-molecular weight resin is formed by the so-called crosslinking reaction. Therefore, for the improvement in curing property of such resinous composition, an attempt has been made to use a melamine resin with relatively large molecular weight. However, the intended objects had not been attained therewith, because of the poor compatibility with alkyd or other base resins and of the decreased reactivity due to the loss of motion of the resinous molecule. Thus, the employable melamine resins have been limited to the only members having a weight-average molecular weight (MW) of 3000~3500 and even for the low temperature curing purpose, to the members having at most the weight-average molecular weight of 3500~4500.

In the self-condensation reaction of melamine resin, co-condensation reaction between melamine resin and other base resin or the like, it is expected that the functional groups carried on the respective resins naturally take part in the reactions, and a number of such groups may participate in the curing of the resins. The inventors, therefore, have examined the structural characteristics based on the number of functional groups (average number of these groups per triazine nucleus), molecular weight and the like of heretofore commercialized melamine resins, including low temperature curing type resins, and obtained the following results.

TABLE 1

| melamine resin | article a | article b | article c | article d |
| --- | --- | --- | --- | --- |
| characteristics wt-ave. mol. weight | 3100 | 3400 | 4500 | 3500 |
| —NH + —NCH$_2$OH | 2.40 | 2.35 | 2.61 | 2.85 |
| —NCH$_2$OH/—NH | 1.79 | 2.79 | 0.67 | 2.90 |
| —NCH$_2$OR | 2.43 | 2.31 | 1.99 | 1.80 |
| NV (%) | 60 | 60 | 50 | 60 |
| R | n-butyl | iso-butyl | n-butyl | iso-butyl |

In the abovesaid analysis, the molecular weight was measured by using Toyo Soda's GPC (Column SHODEX KF-803, with tetrahydrofuran solvent) and calculating in terms of polystyrene; nitrogen by conventional Kjeldahl method; total bound formaldehyde by phosphoric acid decomposition method (J. J. Levenson, Ind. Eng. Chem. Anal. Ed. 12, 332 (1940)); free hydroxymethyl group by Iodo method (Miyauchi, Kobunshi Kagaku, 20, 46 (1963) and alkoxy (butoxy) group by Colorimetry with a part of said phosphoric acid decomposition fraction using p-dimethylaminobenzaldehyde colorant (Miyauchi, Kobunshi Kagaku, 20, 42 (1963)).

Next, the inventors have prepared various melamine resins each having different molecular weight and functional group number, by changing the condensation reaction conditions, and examined the curing conditions and film performance for these resins. As the result, it was found that in regard to the molecular weight of the melamine resin, even with a resin having a considerably larger molecular weight, good compatibility with other base resins and hence an improved curing property can be obtained by controlling the number of alkoxymethylol groups of the melamine resin and controlling the average number of functional groups per triazine nucleus in defined ranges and the self-condensation could be further exaggerated as compared with the co-condensation, thereby attaining a low temperature curing, lowering the temperature dependency for baking temperatures and improving the intercoat adhesion of the composition.

Thus, in the present invention, such melamine resin as having a weight average molecular weight of 6000~12000, preferably 8000~10000 (considerably higher molecular weight than those of heretofore used melamine resins) is selectively used. Furthermore, the average number of alkoxymethylol groups per triazine nucleus is selectively determined to be 2.0 or more. If the average number of said groups is less than 2.0, such resin cannot be used because of the inferior compatibility with base resins. Even if the alkoxymethylol group number is increased to 2.0 or more, the maximum molecular weight must be limited at most to about 12000 from the standpoint of compatibility with the base resin. Whereas, with the melamine resin having a weight average molecular weight of less than 6000, temperature dependency for the baking temperatures would be increased and hence the intercoat adhesion would be undesirably lowered. Next, in the present invention, besides the abovesaid requirement on alkoxymethylol groups per triazine nucleus, the sum of imino groups and methylol groups should be in a range of 2.0~2.5 and the ratio of methylol group number to imino group number in a range of 1.0~2.5.

According to the finding by the present inventors, to attain an object of low temperature curing, it is essential to exaggerate the self-condensation of melamine resin compared to the co-condensation property thereof. To this end, it is desired, expressed in terms of average number of functional groups per triazine nucleus, to have the greatest possible sum of the imino groups and methylol groups and to make the ratio of methylol group number to imino group number as close to 1 by all means. Since there are limits in the functional group numbers per triazine nucleus, the increase in alkoxymethylol group number will naturally cause a decrease in the number of other groups. Under the circumstances, it was found that to have similar baking conditions as proposed for heretofore known low temperature curing type melamine resins, i.e. 100°~120° C. and 20~30 minutes, the sum of imino groups and methylol groups, when expressed in terms of average number per triazine nucleus, must be 2.0~2.5, the number of alkoxymethylol groups must be 2.0 or more and the ratio of methylol group number to imino group number must be in a range of 1.0~2.5. Furthermore, these conditions should be coupled with the condition that weight-average molecular weight is in a range of 6000~12000, as already stated.

When departing from the abovementioned conditions, one is unable to attain the objects of the invention of having a low temperature (100°~120° C.) curing and an improved intercoat adhesion, as shown stated hereinunder. The inventors have further found that the base resin can be any conventional crosslink type resins having functional groups reactive with those of melamine resin, providing they can be coupled with the above-mentioned melamine resin, as for example, alkyd, polyester, acrylic, epoxy, polyurethane, polyamide, polycarbonates resins and mixtures thereof. Also, when selecting an inner catalytic type resin and especially the resin stated in Japanese Patent Application No. 232900/82 whose resinous acid value based on a polycarboxylic acid having a titration midpoint potential in non-aqueous potentiometric titration, under the state capable of developing resinous acid value, of less than −300 mV, is 2 to 50 and which has functional groups reactive with those of melamine resin, a very low temperature (e.g. 80°~120° C.) bake curing can be realized and far better intercoat adhesion can be obtained therewith. Preferably, the solid weight ratio of the melamine resin to the cross link curable resin is 5/95–40/60.

The invention shall now be more fully explained in the following Examples. Unless otherwise stated, all parts are by weight.

EXAMPLE 1

(Preparation of melamine resin)

Into a four necked flask fitted with stirrer, reflux condenser and thermometer, were placed 335 parts of Formit NB (40% formaline n-butanol solution, manufactured by Koei Chem. K.K.), 140.4 parts of n-butanol and 126 parts of melamine resin, and the mixture was reacted at a reflux temperature for 10 minutes, adjusted to pH 3.2 with hydrochloric acid and further reacted under refluxing condition for 20 minutes. Thereafter, a mixed solution of 168 parts of n-butanol, 126 parts of xylene and 28 parts of deionized water was added and the mixture was refluxed while removing the formed water, for 3 hours and then concentrated under reduced pressure to obtain a melamine resin solution A (non-volatile content of 60%). This was analyzed and the test results were as shown in Table 2.

EXAMPLE 2

In a similar reaction vessel as used in Example 1, were weighted 335 parts of formit NB, 158 parts of n-butanol and 126 parts of melamine and the mixture was reacted at a refluxing temperature for 10 minutes. After adjusting the pH to 3.6 with formic acid, the reaction was continued under refluxing condition for additional 10 minutes, and the mixture was added with a mixed solvent of 127 parts of n-butanol, 102 parts of xylene and 9.8 parts of deionized water, refluxed for 3 hours while removing the formed water and finally subjected to a vacuum concentration to obtain a melamine resin solution B having a solid content of 60%. Analytical data are shown in Table 2.

EXAMPLE 3

In a similar reaction vessel as used in Example 1, were weighed 337 parts of formit NB, 141 parts of n-butanol and 126 parts of melamine, and the mixture was reacted at a refluxing temperature for 10 minutes. After adjusting the pH at 3.2 with hydrochloric acid, the reaction was continued under refluxing condition for additional 20 minutes, and the mixture was added with a mixed solvent of 121 parts of n-butanol, 56 parts of xylene and 9.3 parts of deionized water, reacted under refluxing condition while removing the formed water for 3 hours and finally concentrated under reduced pressure to obtain a melamine resin solution C having a solid content of 60%. This was analyzed and the test results were as shown in Table 2.

EXAMPLE 4

In a similar reaction vessel as used in Example 1, were weighed 395 parts of formit NB, 121 parts of n-butanol and 126 parts of melamine and after adjusting the pH to 7.8 with triethylamine, the mixture was reacted at a refluxing temperature for 10 minutes. Thereafter, a mixed solvent of 57 parts of n-butanol, 16 parts of xylene and 8 parts of deionized water was added and the mxiture was adjusted to pH 3.4 with formic acid and reacted at 95° C. for 60 minutes. Then, 57 parts of xylene were added and the mixture was refluxed for 3 hours and 30 minutes while removing the formed water therefrom, and finally subjected to vacuum concentration to obtain a melamine resin solution D having a solid content of 60%. The analytical datas are shown in Table 2.

EXAMPLE 5

Using the similar reaction vessel as used in Example 1 and the materials as used in Example 4, a methylolization was carried out. Thereafter, a mixed solvent of 84 parts of n-butanol, 24 parts of xylene and 12 parts of deionized water was added and after adjusting the pH to 3.2 with formic acid, reacted at 95° C. for 60 minutes. 50 Parts of xylene were then added and the mixture was refluxed, while removing the formed water therefrom, for 4 hours and finally condensed under reduced pressure to obtain a melamine resin solution E having a solid content of 60%. The analytical data are shown in Table 2.

EXAMPLE 6

In a similar reaction vessel as used in Example 1, were weighed 447 parts of formit NB (40% formaline isobutanol solution, manufactured by Koei Chem. K.K.), 144 parts of isobutanol, 50 parts of deionized water and 126 parts of melamine and the mixture was reacted at a refluxing temperature for 20 minutes. Thereafter, a mixed solvent of 45 parts of xylene, 36 parts of isobutanol and 4.3 parts of deionized water was added and subjected to dehydration under refluxing condition for 5 hours. The mixture was concentrated under reduced pressure to obtain a melamine resin solution F having a solid content of 60%, whose analytical data are shown in Table 2.

EXAMPLE 7

(Preparation of acrylic resin)

Into a four necked flask fitted with stirrer, reflux condenser, thermometer and dropping funnel, were placed 10 parts of xylene, 60 parts of n-butanol, 2.6 parts of acrylic acid (AA), 40 parts of styrene (St), 21.1 parts of n-butyl methacrylate (n-BMA), 20.7 parts of n-butanol acrylate (n-BA) and 15.5 parts of 2-hydroxyethyl methacrylate (2-HEMA) and the mixture was heated to 120° C. To this, a mixture of 30 parts of xylene and 2.0 parts of azobisisobutyronitrile (AIBN) was added dropwise at a constant speed over 3 hours and after completion of said addition, the mixture was kept standing for 2 hours to complete the reaction. Thus obtained acrylic resin varnish (I) had the characteristics of molecular weight about 20,000 (GPC analysis), non-volatile content 50%, resinous acid value 20, hydroxyl number 70 and viscosity U.

EXAMPLE 8

(Preparation of polyester resin)

Into a four necked flask fitted with stirrer, reflux condenser, thermometer, water separation tube and fractionating tower, were placed 133 parts of isophthalic acid, 29.2 parts of adipic acid, 25.1 parts of trimethylolpropane, 52.8 parts of neopentylglycol and 56 parts of 1,6-hexanediol and the mixture was heated. At the stage when the materials were melted and reached a stirrable condition, stirring was commenced and the vessel temperature was raised to 220° C. At this time, from 160° to 220° C., the temperature was raised at a constant speed in 3 hours. The formed water was continuously removed out of the system. When the temperature reached to 220° C., the mixture was maintained at the same temperature for 1 hour and then 5 parts of xylene were gradually added as refluxing solvent and the reaction was switched to condensation in the presence of solvent and continued for additional time until the resinous acid value was 8.0. After cooling the reaction mixture, 18.2 parts of xylene and 13.7 parts of cellosolve acetate were added to obtain a polyester resin varnish II, which had the characteristics of molecular weight (by GPC) about 8000, solid content 65.2%, resinous acid value 8.0 and viscosity V.

EXAMPLE 9

(Preparation of resin having inner catalytic function)

In a similar reaction vessel as used in Example 8, were placed 127 parts of isophthalic acid, 29.2 parts of adipic acid, 25.1 parts of trimethylolpropane, 52.8 parts of neopentylglycol and 56.0 parts of 1,6-hexanediol, and the mixture was reacted as in Example 8 until the resinous acid value was 2.0. Thereafter, the mixture was cooled to 100° C., added with 3.7 parts of pyromellitic anhydride, heated to 160° C. and reacted until the resinous acid value was 8.0. After cooling, 118.2 parts of xylene and 13.7 parts of cellosolve acetate were added to obtain a polyester resin solution III, the molecular weight (by GPC) of the resin being about 8000, and the resinous varnish showing solid content of 64.6%, resinous acid value of 8.6 and viscosity of X.

TABLE 2

| Example | 1 | 2 | 3 | 4 | 5 | 6 |
| --- | --- | --- | --- | --- | --- | --- |
| varnish | A | B | C | D | E | F |
| MW* | 6100 | 6900 | 8000 | 8500 | 11800 | 7500 |
| —NH + —NCH$_2$OH | 2.45 | 2.17 | 2.24 | 2.10 | 2.03 | 2.36 |
| —NCH$_2$OH/—NH | 2.10 | 1.15 | 1.30 | 2.33 | 2.32 | 1.56 |
| —NCH$_2$OR | 2.20 | 2.22 | 2.18 | 2.32 | 2.22 | 2.07 |
| non-volatile % | 60.6 | 60.0 | 60.2 | 59.7 | 60.4 | 60.3 |
| viscosity | W | UV | X | W–X | Z | W |

*weight average molecular weight

EXAMPLE 10

35.0 parts (solid weight parts) of acrylic resin I obtained in Example 7 and 15.0 parts (solid weight parts) of melamine resin A obtained in Example 1 were mixed well. The composition was applied on a tinplate with a 16 mil doctor blade. After standing for a defined period of time, these plates were cured under different baking conditions, and the coatings were peeled off by a mercury amalgamation process and then subjected to a clear film test.

In the next series of film tests, a white colored dispersion paste was first prepared by adding to a composition of 35.0 parts (solid weight parts) of the acrylic resin I and 15.0 parts (solid weight parts) of the melamine resin A, 8.0 parts of xylene, 4.0 parts of Solvesso 100, 7.0 parts of n-butanol, 0.010 part of Silicon KF-69 (silicon oil, manufactured by Shinetsu Kagaku K.K.) and 45 parts of Titanium white CR-95 (Ishihara Sangyo K.K.) and mixing well. To this, were added a diluting solvent mixture comprising 20.0 parts of Solvesso 100, 50.0 parts of toluene, 10.0 parts of xylene and 20.0 parts of n-butanol to adjust the viscosity to 20 sec./25° C. Ford cup #4 viscosity. Thus obtained white coating composition was then applied onto a zinc phosphate treated dull steel plate by spraying and baked under different conditions, and film performances were evaluated. The clear film properties and film performances obtained are shown in Table 3.

EXAMPLES 11-18

The same procedures as stated in Example 10 were repeated, excepting using melamine resins C~F obtained in Examples 2~6 and acrylic resin I or polyester resin II obtained in Example 8 and following the prescriptions given in Table 3. Thus obtained clear film properties and film performances are also shown in Table 3.

COMPARATIVE EXAMPLES 1-4

Using the same procedures as stated in Example 10, commercialized melamine resin a or c and acrylic resin II or polyester resin II were mixed well in the solid weight ratio as shown in Table 3. The clear film properties and film performances were evaluated as in Example 10 and the results are given in Table 3.

As is clear from the results shown in Table 3, low temperature baking and improved intercoat adhesion had been achieved with the melamine resins specified in the present invention.

EXAMPLE 19

In the solid weight ratio shown in Table 4, melamine resin D and polyester resin III obtained in Example 9 were compounded and the coating composition was prepared as in Example 10. After applying onto a similar steel plate, the coating was baked under the condition as given in Table 4. The clear film properties and film performances were evaluated and are shown in Table 4.

COMPARATIVE EXAMPLE 5

Commercialized melamine resin c and polyester resin III were mixed well in the solid weight ratio shown in Table 4 and thereafter the same procedures as given in Example 10 were repeated excepting using the baking condition given in Table 4. The clear film properties and film performances were evaluated and the results are shown in Table 4. These results clearly show that the combination of the present melamine resin and the crosslinking type resin whose resinous acid value based on a polycarboxylic acid having a titration midpoint potential in non-aqueous potentiometric titration, under a state capable of developing resinous acid value, of less than −300 mV, is 2-50 can afford far better results in regard to low temperature baking and intercoat adhesion as compared with those of the control. In these Examples, the following tests were conducted.

Clear film properties (1) Measurement of gel fraction percentage

A coating was subjected to a solvent extraction using Soxhlet apparatus and mixed solvent of acetone/methanol=1/1 (Wt ratio) at 70° C. for 5 hours, and then dried in a dryer at 120° C. for 30 minutes and allowed to cool in a desiccator. After cooling, the coating was weighed and gel fraction percentage was calculated.

(2)
$\Delta Tg = Tg$ at 160° C.×30'13 Tg at 100° C.×30'
$\Delta Tg' = Tg$ at 140° C.×30'—Tg at 80° C.×30'

Determination of glass transition point Non-resonant forced oscillation dynamic viscoelastometer (REO VIBRON, DDV-II-EA, manufactured by Toyo Baldwin Co. Ltd.) was used.

Measuring conditions were set to
frequency=11 Hz, temperature raising speed=2° C./min.

Film performance (3) Pencil hardness

Judgement was made by the maximum hardness which does not cause any scratches by Mitubishi Uni pencil.

(4) Solvent resistance

Test plate was subjected to 100 times xylene rubbings and the surface condition was visually observed.
: no abnormality X: damaged (5) Intercoat adhesion The first coat was baked under the condition stated in the Table, the second coat was applied after the lapse of 60 minutes, baked under the condition stated in the parenthesis and kept standing for 30 minutes at room temperature. Lattice cut adhesion test was carried out.
: no peeling
: slight peeling
Δ: whole peeling in the square
X: whole peeling from the squares other than the cut portion

TABLE 3

| | E (example) C (Comp. Ex.) | | | | | | | | | | | | |
|---|---|---|---|---|---|---|---|---|---|---|---|---|---|
| | E 10 | E 11 | E 12 | E 13 | E 14 | E 15 | E 16 | E 17 | C 1 | C 2 | E 18 | C 3 | C 4 |
| Compounding* | | | | | | | | | | | | | |
| melamine resin | A 15 | B 15 | C 15 | D 15 | E 15 | F 15 | C 5 | C 20 | c 15 | a 15 | D 15 | c 15 | a 15 |
| acrylic resin I | 35 | 35 | 35 | 35 | 35 | 35 | 45 | 30 | 35 | 35 | | | |
| polyester resin II | | | | | | | | | | | 35 | 35 | 35 |
| Clear film properties | | | | | | | | | | | | | |
| gel frac. percentage % (100° C. × 30') | 87 | 90 | 92 | 95 | 93 | 92 | 83 | 94 | 93 | 53 | 92 | 93 | 48 |
| ΔTg (°C.) | 24 | 21 | 17 | 16 | 20 | 24 | 15 | 16 | 38 | 40 | 14 | 35 | 40 |
| Film performances | | | | | | | | | | | | | |
| pencil hardness (100° C. × 30') | H~2H | 2H | 2H | 2H | 2H | 2H | H | 2H~3H | 2H | 2B | F | F | 4B |
| solvent resistance | | | | | | | | | | X | | | X |

TABLE 3-continued

| | E (example) | | | | | | | | C (Comp. Ex.) | | | | |
|---|---|---|---|---|---|---|---|---|---|---|---|---|---|
| | E 10 | E 11 | E 12 | E 13 | E 14 | E 15 | E 16 | E 17 | C 1 | C 2 | E 18 | C 3 | C 4 |
| (100° C. × 30') intercoat adhesion (140° C. × 40') (2nd coat 100° C. × 30') | | | | | | | | | X | | | X | |

*solid weight parts

TABLE 4

| | E (example) | C (Comp. Ex.) |
|---|---|---|
| | E 19 | C 5 |
| Compounding | | |
| melamine resin | D 15 | c 15 |
| polyester resin III | 35 | 35 |
| Clear film properties | | |
| gel frac. percentage % (80° C. × 30') | 89 | 92 |
| Δ Tg' (°C.) | 15 | 40 |
| Film performances | | |
| pencil hardness (80° C. × 30') | F~H | F~H |
| solvent resistance (80° C. × 30') | | |
| intercoat adhesion (120° C. × 40') (2nd coat 80° C. × 30') | | X |

What is claimed is:

1. A coating composition containing, as a resinous vehicle, a melamine resin (A) having a weight-average molecular weight by Gel Permeation Chromatography of 6000–12000 and having as functional groups, imino, methylol and alkoxymethylol groups, the sum of the imino and methylol groups being, when expressed in terms of average numbers of the functional groups per triazine nucleus, 2.0–2.5, the number of alkoxymethylol groups being 2.0 or more, and the ratio of the number of methylol groups to the number of imino groups being 1.0–2.5, and a crosslink curable resin (B) having functional groups which are reactive with the functional groups of said melamine resin and being selected from the group consisting of polyester resin, acrylic resin, epoxy resin and polyurethane resin.

2. The composition according to claim 1 wherein the solid weight ratio of said melamine resin (A) to said crosslink curable resin (B) is 5/95–40/60.

3. The composition according to claim 1, wherein the alkoxymethylol group is a butyloxymethylol group.

4. The composition according to claim 1, wherein the crosslink curable resin has a resinous acid value based on a polycarboxylic acid having a titration midpoint potential in non-aqueous potentiometric titration, under a state capable of developing the resinous acid value, of −300 mV, of 2–50.

5. A coating composition according to claim 1 wherein the polyester resin is an alkyd resin.

* * * * *